United States Patent
Crawford et al.

(10) Patent No.: US 10,197,677 B1
(45) Date of Patent: Feb. 5, 2019

(54) LASER SPOT TRACKING RECEIVER

(71) Applicant: Analog Modules, Inc, Longwood, FL (US)

(72) Inventors: Ian Drummond Crawford, Longwood, FL (US); Charles Gary Smith, Sanford, FL (US)

(73) Assignee: Analog Modules, Inc., Longwood, FL (US)

( * ) Notice: Subject to any disclaimer, the term of this patent is extended or adjusted under 35 U.S.C. 154(b) by 543 days.

(21) Appl. No.: 14/672,149

(22) Filed: Mar. 28, 2015

Related U.S. Application Data

(60) Provisional application No. 61/971,651, filed on Mar. 28, 2014.

(51) Int. Cl.
*G01C 3/08* (2006.01)
*G01S 17/66* (2006.01)
*G01S 7/481* (2006.01)

(52) U.S. Cl.
CPC .......... *G01S 17/66* (2013.01); *G01S 7/4816* (2013.01)

(58) Field of Classification Search
CPC .............................. G01S 17/66; G01S 7/4816
See application file for complete search history.

(56) References Cited

U.S. PATENT DOCUMENTS

| | | | |
|---|---|---|---|
| 2013/0070239 A1* | 3/2013 | Crawford | G01S 17/66 356/139.04 |
| 2013/0321822 A1* | 12/2013 | Vogler | A61B 3/1005 356/497 |

FOREIGN PATENT DOCUMENTS

DE     102012105379 B3 *  7/2013  ......... G01N 15/1459

\* cited by examiner

*Primary Examiner* — Samantha K Abraham
(74) *Attorney, Agent, or Firm* — Michael D. Eisenberg

(57) ABSTRACT

A technique for is presented for locating at least one object illuminated by a laser designator. A detector and an optical unit are provided. The one optical unit is configured for receiving a beam of laser light scattered by the at least one object being illuminated by the laser designator, for creating two secondary beams, and for focusing the two secondary beams to respective foci along an optical axis of the at least one optical unit. The detector is located between the two foci, divided into an even number of portions, and is configured for measuring an intensity of impinging light at each portion. The optical unit is configured for causing the received laser light to impinge the detector, such that an upright image and an inverted image of the scattered laser light beam having substantially equal sizes and substantially equal energies are projected on the detector.

18 Claims, 8 Drawing Sheets

LASER SPOT TRACKING RECEIVER

CROSS-REFERENCES TO RELATED APPLICATIONS

The present application is a non-provisional of Provisional Patent Application 61/971,651 filed on Mar. 28, 2014, which is hereby incorporated herein by reference in its entirety.

TECHNICAL FIELD

The present invention generally relates to electronic guidance systems for weapons, and more in particular to guidance systems for laser-guided weapons (LGWs).

BACKGROUND OF THE INVENTION

Laser-guided munitions (generally referred to as laser-guided bombs (LGBs), laser guided weapon systems (such as in an aircraft), or laser-guided weapons (LGWs) use a laser designator to mark (illuminate, "paint") a target. The reflected laser light ("sparkle") from the target is then detected by the seeker head of the weapon, which sends signals to the weapon's control surfaces (e.g., fins) to guide the weapon toward the designated point. The illuminating laser light is encoded, and the laser receiver in the LGW is set to react only to reflected laser light having the proper code.

FIG. 1 illustrates an exemplary procedure for aircraft with laser-guided weapons (LGWs) and laser spot trackers, as set forth in *Joint Pub* 3-09.1, *Joint Tactics, Techniques, and Procedures for Laser Designation Operations*, 28 May 1999, incorporated in its entirety by reference herein, at page B-B-2.

In this scenario 100, an aircraft 102 is equipped with a LGW 104 which is shown already in its ballistic trajectory towards a target 106. Also illustrated is a forward air controller (FAC) 108, and a laser designator operator (LDO) 110. The FAC 108 is in radio communication with the pilot of the aircraft 102 and with the LDO 110. The LDO 110 illuminates the target 106 with a laser, and laser light is reflected back, typically as scattered reflections called "sparkle".

Generally, the sequence of events is that the maneuver unit commander (not shown) decides to request close air support. The FAC coordinates laser code, laser target line and frequency and/or call sign of the LDO. The airstrike request includes laser-related data. An airstrike approval message is received, and the aircraft is dispatched to a contact point to check in with FAC. The FAC coordinates laser code, laser-target line and frequency and/or call sign with LDO and pilot. Approaching the target, the aircraft calls in. The FAC relays laser control calls. The LDO designates the target (by illuminating it with laser beam). The aircraft acquires the target or releases the LGW. The LGW heads towards the target, adjusting its trajectory based on sparkle from the laser-illuminated target. The target is destroyed.

In the prior art, many techniques have been devised to improve the accuracy of the identification of the target by the seeker head of LGWs.

For example, co-owned U.S. Pat. No. 8,451,432 describes, inter alia, a method of reducing errors due to beam irregularities or hot spots, which reduce the stability and accuracy of the centroid of the spot on the quadrant detector. Existing approaches use diffusers, fiber optic faceplates, or lenslets to create a pattern on the detector to improve spatial homogenization. U.S. Pat. No. 7,498,558 uses a non-imaging lens to distort the wave front. U.S. Pat. No. 7,575,191 is similar to the above, except that it specifies a purchased engineering diffuser rather than describe the manufacturing process. U.S. Pat. No. 8,164,037 describes a dual-mode semi active laser (SAL) with a spreader element that is wide in its definition. U.S. Pat. No. 8,188,411 describes an integrated stack, including a spreader element comprising an array of lenslets, typically rectangular, or a diffuser. U.S. Pat. No. 8,207,481 describes the use of a Fresnel lens. This is a single focus system that uses the Fresnel lens to reduce size and weight.

BRIEF SUMMARY OF EMBODIMENTS OF THE INVENTION

The term "hot spot" refers to effects that reduce the stability and accuracy of the centroid of the spot of the reflected laser light received by a weapon's seeker head. The effects may be due to irregularities in the reflected beam and/or irregularities on the seeker head, and may include, for example vignetting, smudges on the lens of the seeker head, dirt on the lens of the seeker head, and low energy spots in the collected optical energy.

In U.S. Pat. No. 8,451,432, the inventors of the present invention provided a system which defocuses the received laser beam, splits the beam into two different beams, and directs each defocused beams toward respective detectors. The data from both detectors is processed to cancel or diminish effects of hot spots.

In order to provide a more robust technique for diminishing hot spot effects, the present invention uses a bifocal element for creating two beam sets, and a single detector for receiving the two beam sets. The effects of each hot spot are then found at two locations on the detector, the locations being symmetrical with respect to the centroid of the beam sets. The present technique is more robust as only one detector is used, and therefore a difference in some operation parameters between two detectors cannot affect the identification of the centroid. Moreover, splitting the beam set and separately directing each beam to a different location is not needed, as both beam sets in the present invention are directed to the same detector.

Therefore, an aspect of some embodiments of the present invention relate to a method of locating at least one object being illuminated by a laser designator. The method comprises: (i) providing a tracker having a detector in a field of view, the detector having a sensing surface divided into an even number of portions, the even number being at least four, such that all portions meet at a middle point of the sensing surface, the detector being configured for measuring an intensity of impinging light at each portion; (ii) receiving a beam of laser light scattered by the at least one object being illuminated by the laser designator; (iii) causing the received laser light to impinge the detector's sensing surface, such that an upright image and an inverted image of the scattered laser light beam are projected on the quadrant detector, the upright image and the inverted image having substantially equal sizes and substantially equal energies; (iv) measuring respective intensities at each portion of the detector; (v) processing the measured intensities to find a centroid of the projected laser light, the centroid of the projected laser light being indicative of a location of the object with respect to the tracker.

Optionally, step (iii) comprises: creating two secondary beams of substantially equal energies from the received beam; and focusing the two secondary beams to respective focal points along a single axis, such that the sensing surface of the detector is located between the focal points, at a location in which the secondary beams have equal cross-sectional length.

In a variant, creating two secondary beams comprises providing a bifocal optical element in an optical path of the received beam.

The bifocal element may be refractive or reflective.

In another variant, focusing the two secondary beams comprises providing a refractive unit in an optical path of the received beam or in respective optical paths of the two secondary beams.

The refractive unit may be integrated with the bifocal optical element or may be separate from the bifocal optical element.

In some embodiments of the present invention, the bifocal optical element sports concentric circular surfaces. Circumferences of the circular surfaces are substantially perpendicular to an optical axis of the bifocal optical element. Each circular surface has a respective slope which is at a non-zero angle with the optical axis of the bifocal optical element. The concentric circular surfaces have respective slopes chosen from two predetermined slopes. In at least one portion of the bifocal optical element, each circular surface having a first of the two predetermined slopes is adjacent to a subsequent circular surface having a second of the two predetermined slopes. Substantially half of the incident beam interacts with the circular surfaces having the first slope, and substantially half of the incident beam interacts with the circular surfaces having the second slope.

In a variant, the first slope is substantially perpendicular to the optical axis of the bifocal optical element.

In another variant, the first and second slopes have a similar absolute value and opposite sign.

In a further variant, transition zones between circular surface of different slopes are rounded.

In yet a further variant, the bifocal optical element is impressed on at least one surface of a focusing lens.

Optionally, the bifocal optical element sports concentric circular surfaces. Circumferences of the circular surfaces are substantially perpendicular to an optical axis of the bifocal optical element. Each circular surface has a respective slope which is at a non-zero angle with the optical axis of the bifocal optical element. The concentric circular surfaces have respective slopes, such that the bifocal optical element has two foci.

Optionally, the bifocal optical element comprises a Fresnel lens, having a 50% diffraction section and a 50% pass through section.

In a variant, the portions of the detector's sensing surface are set in pairs opposite to each other with respect to the center of the sensing surface, such that the portions of any pair are symmetrical to each other with respect to the center of the sensing surface.

Optionally, an angle between a first line separating a portion from a preceding portion and a second line separating the portion from a subsequent portion is equal for all portions.

In a variant, the detector's sensing surface is divided into four equal portions.

Optionally, processing the measured intensities comprises calculating an azimuth and an elevation of the centroid via formulas:

$$\text{Azimuth} = \{(I_A + I_D) - (I_B + I_C)\} / \{I_A + I_B + I_C + I_D\}; \text{ and}$$

$$\text{Elevation} = \{(I_A + I_B) - (I_C + I_D)\} / \{I_A + I_B + I_C + I_D\};$$

wherein $I_A$, $I_B$, $I_C$, $I_D$ are intensities measured at quadrants A, B, C, D, the quadrant A being a top left quadrant, the quadrant B being a top right quadrant, the quadrant C being a bottom right quadrant, and the quadrant D being a bottom left quadrant.

Optionally, processing the measured intensities comprises the correcting the calculated azimuth and elevation when the centroid is removed from the center of the detector's sensing surface.

Another aspect of some embodiments of the present invention relates to a system for locating at least one object being illuminated by a laser designator. The system includes a detector and at least one optical unit. The detector has a sensing surface divided into an even number of portions, the even number being at least four, such that all portions meet at a middle point of the sensing surface, the detector being configured for measuring an intensity of impinging light at each portion. The at least one optical unit is configured for receiving a beam of laser light scattered by the at least one object being illuminated by the laser designator, for creating two secondary beams, and for focusing the two secondary beams to respective foci along an optical axis of the at least one optical unit. The detector's sensing surface is located between to two foci. The at least one optical unit is configured for causing the received laser light to impinge the detector's sensing surface, such that an upright image and an inverted image of the scattered laser light beam are projected on the quadrant detector, the upright image and the inverted image having substantially equal sizes and substantially equal energies.

In a variant, the at least one optical unit comprises a bifocal optical element configured for creating the two secondary beams, and for focusing the two secondary beams to the respective foci.

In another variant, the at least one optical unit comprises a bifocal optical element and a refractive unit. The bifocal optical element is configured for creating the two secondary beams. The refractive unit is configured for interacting with the received the beam of scattered laser light or with the two secondary beams, thus causing the two secondary beams to be focused to the respective foci.

In yet another variant, the bifocal optical element is reflective or refractive.

In a further variant, the portions of the detector's sensing surface are set in pairs opposite to each other with respect to the center of the sensing surface, such that the portions of any pair are symmetrical to each other with respect to the center of the sensing surface.

In yet a further variant, an angle between a first line separating a portion from a preceding portion and a second line separating the portion from a subsequent portion is equal for all portions.

Optionally, the optical unit further comprises a diffuser.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
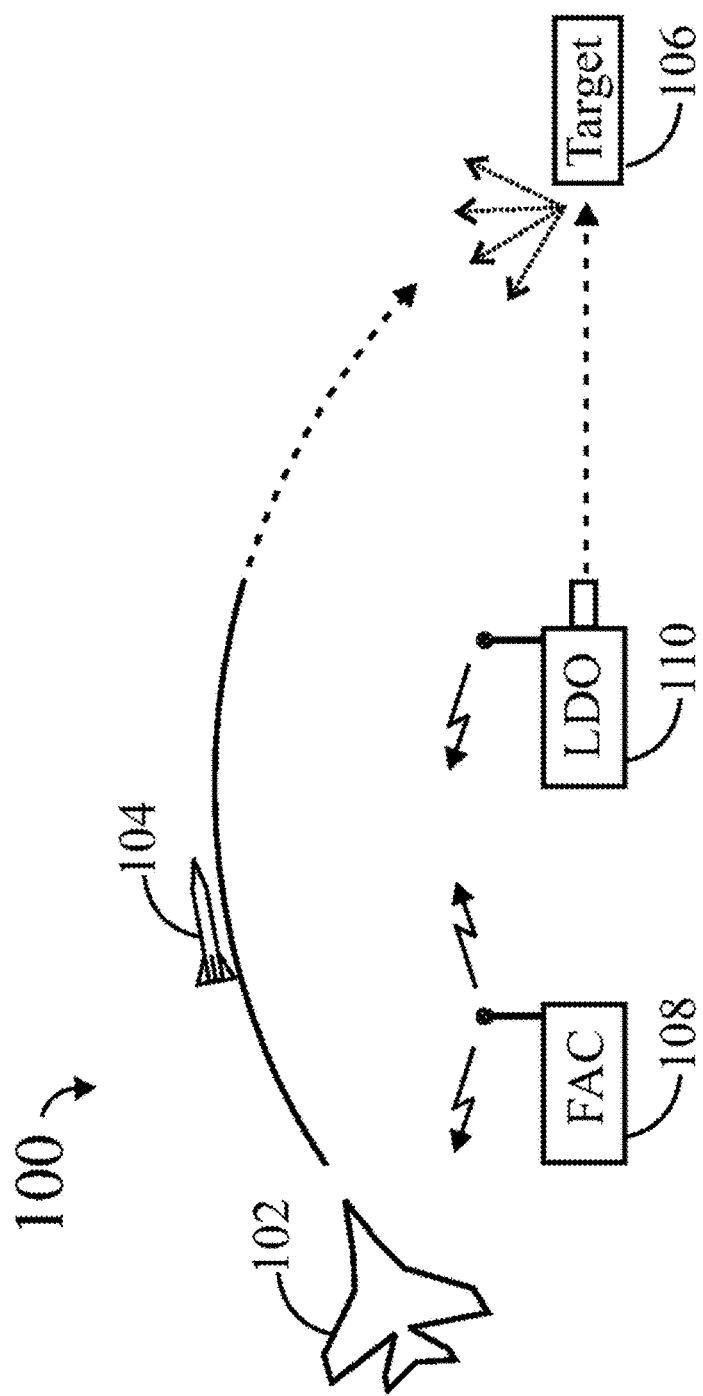
Figure 2:
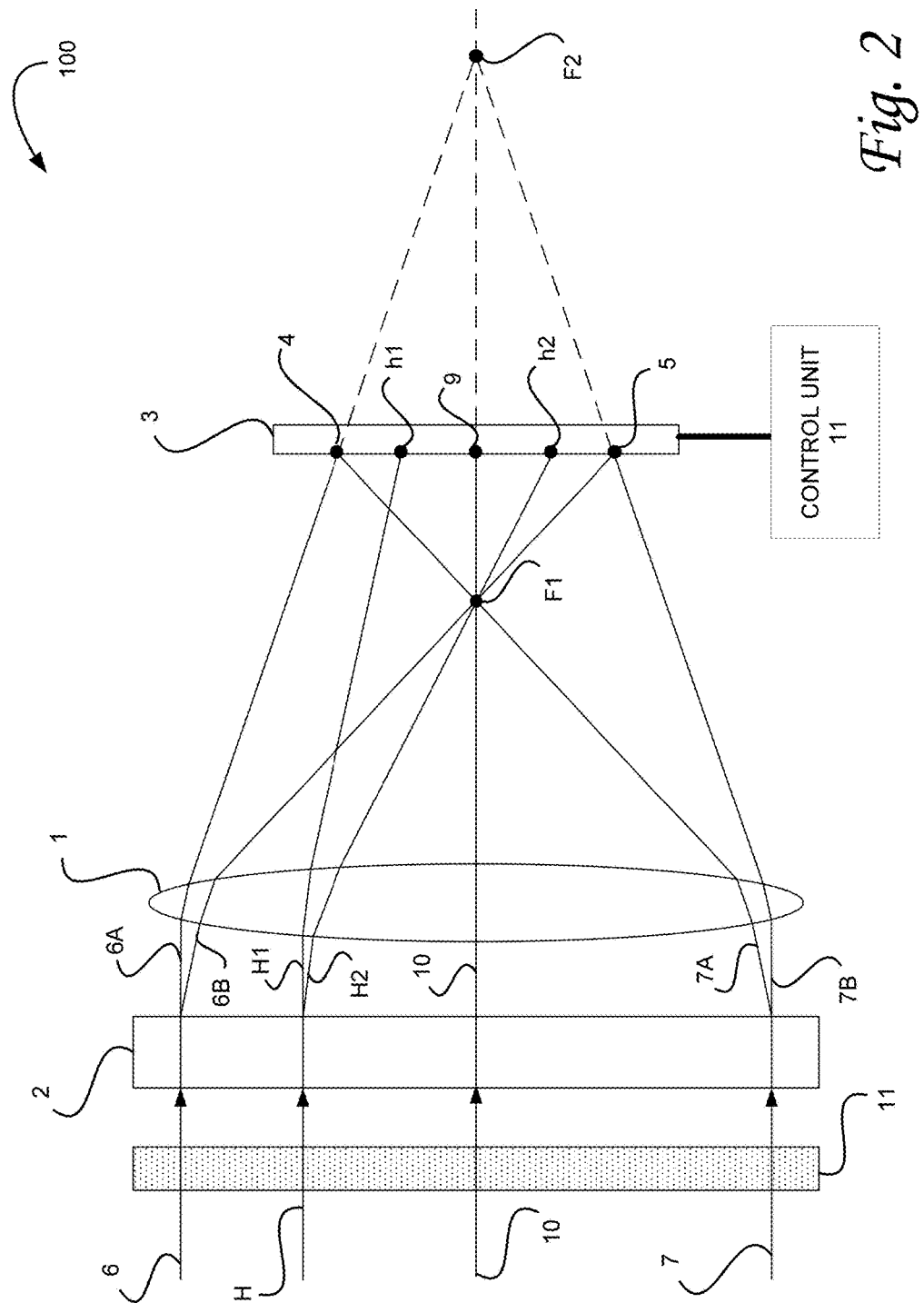
Figure 3:
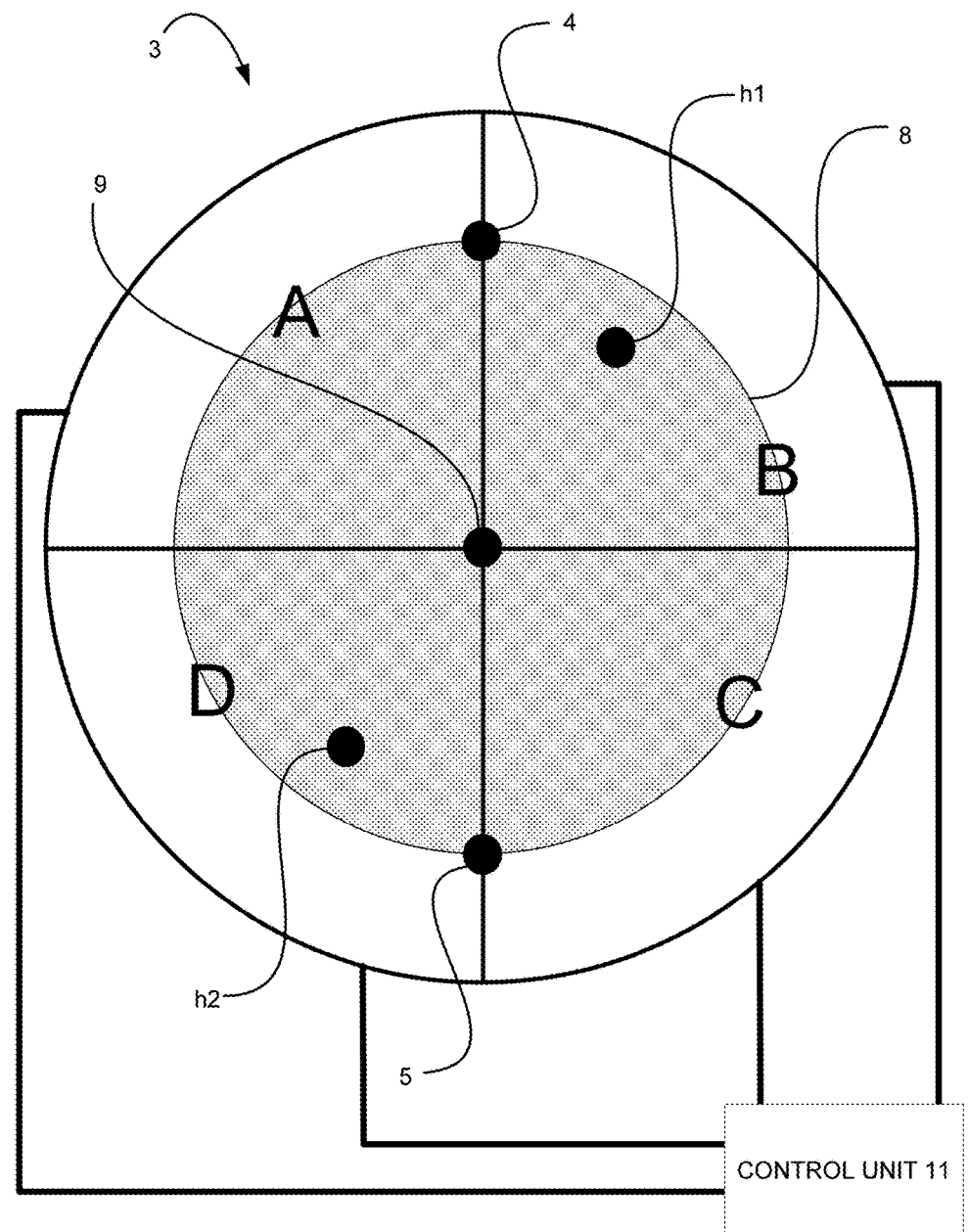
Figure 4:
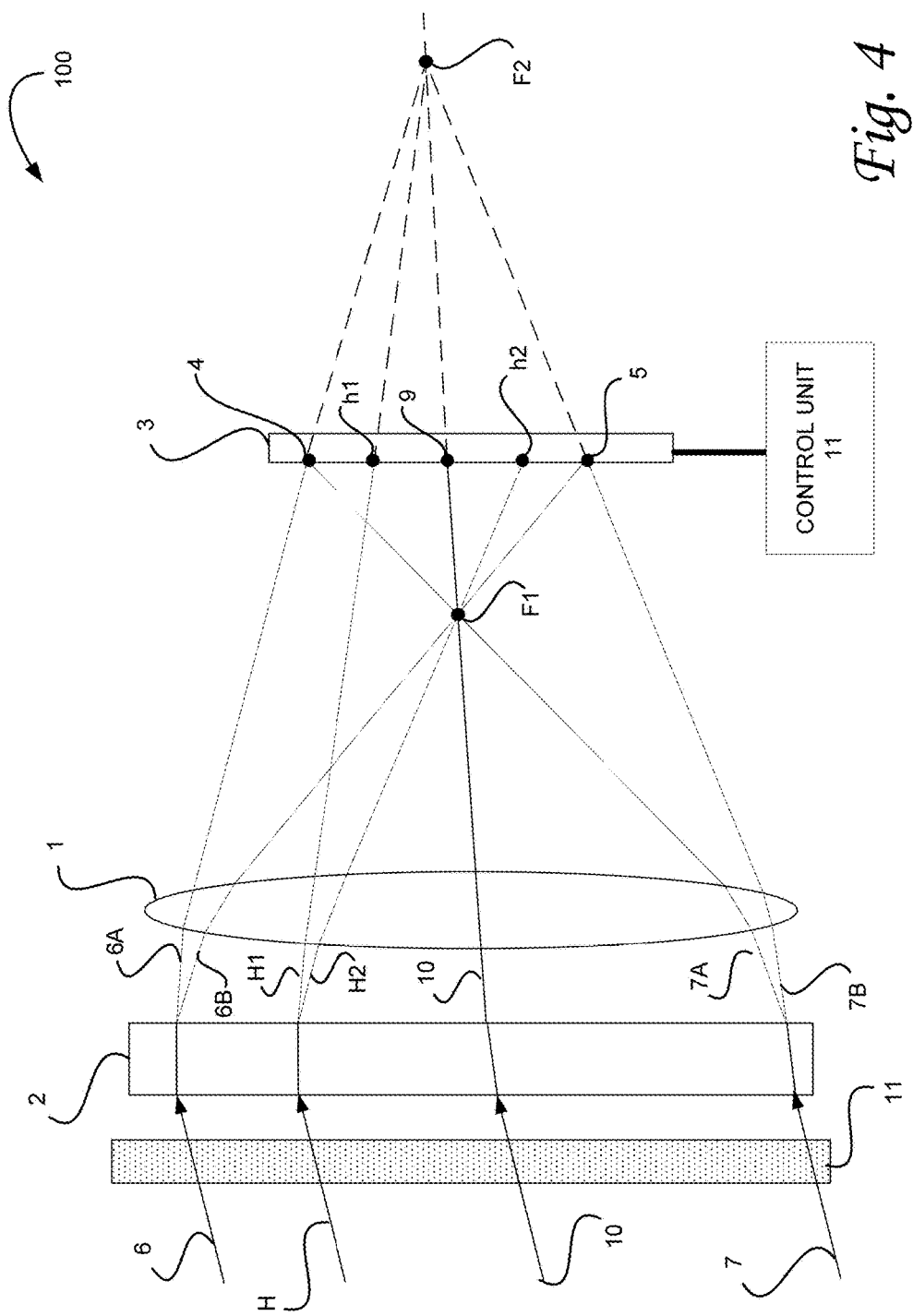
Figure 5:
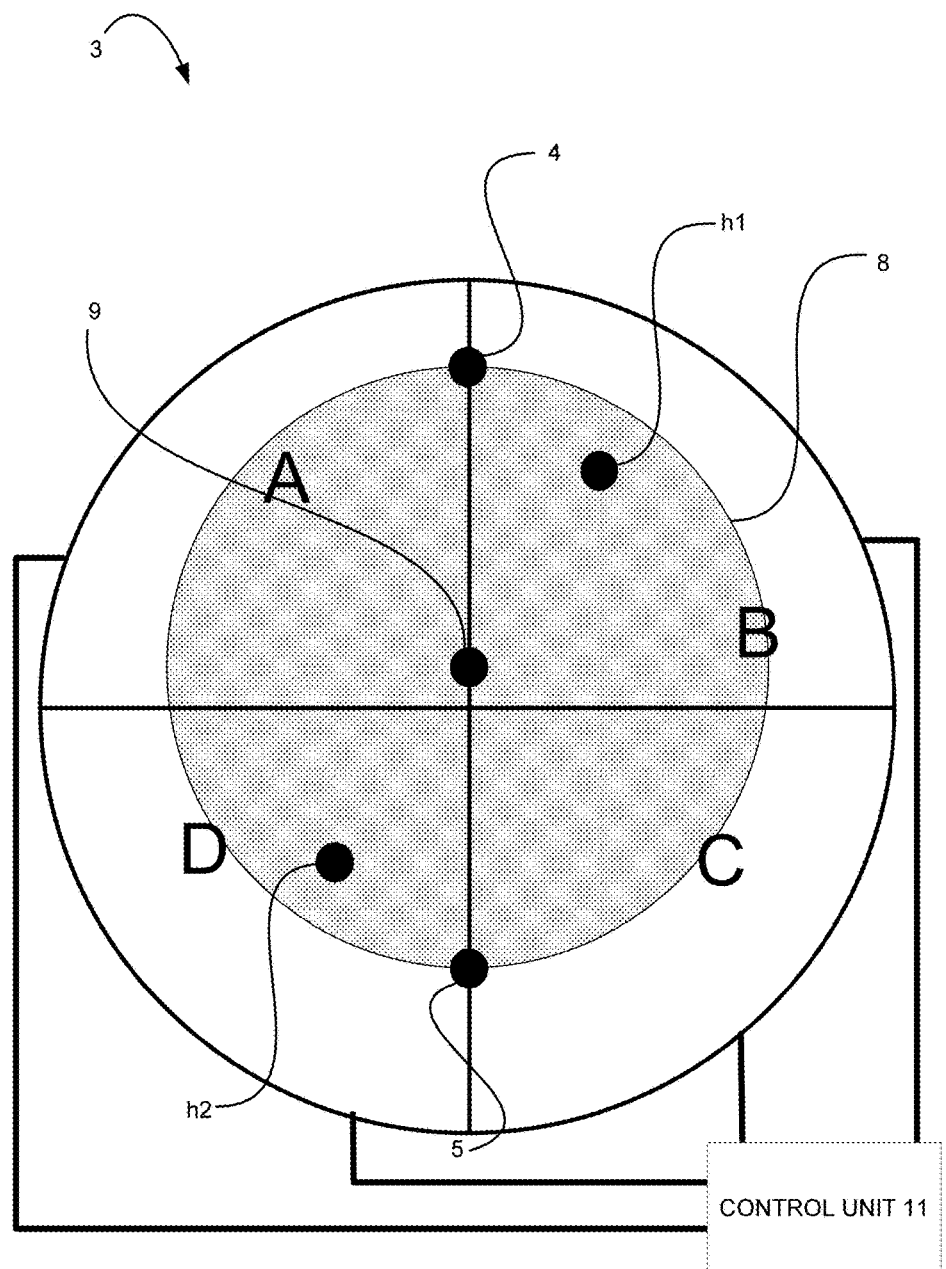
Figure 6:
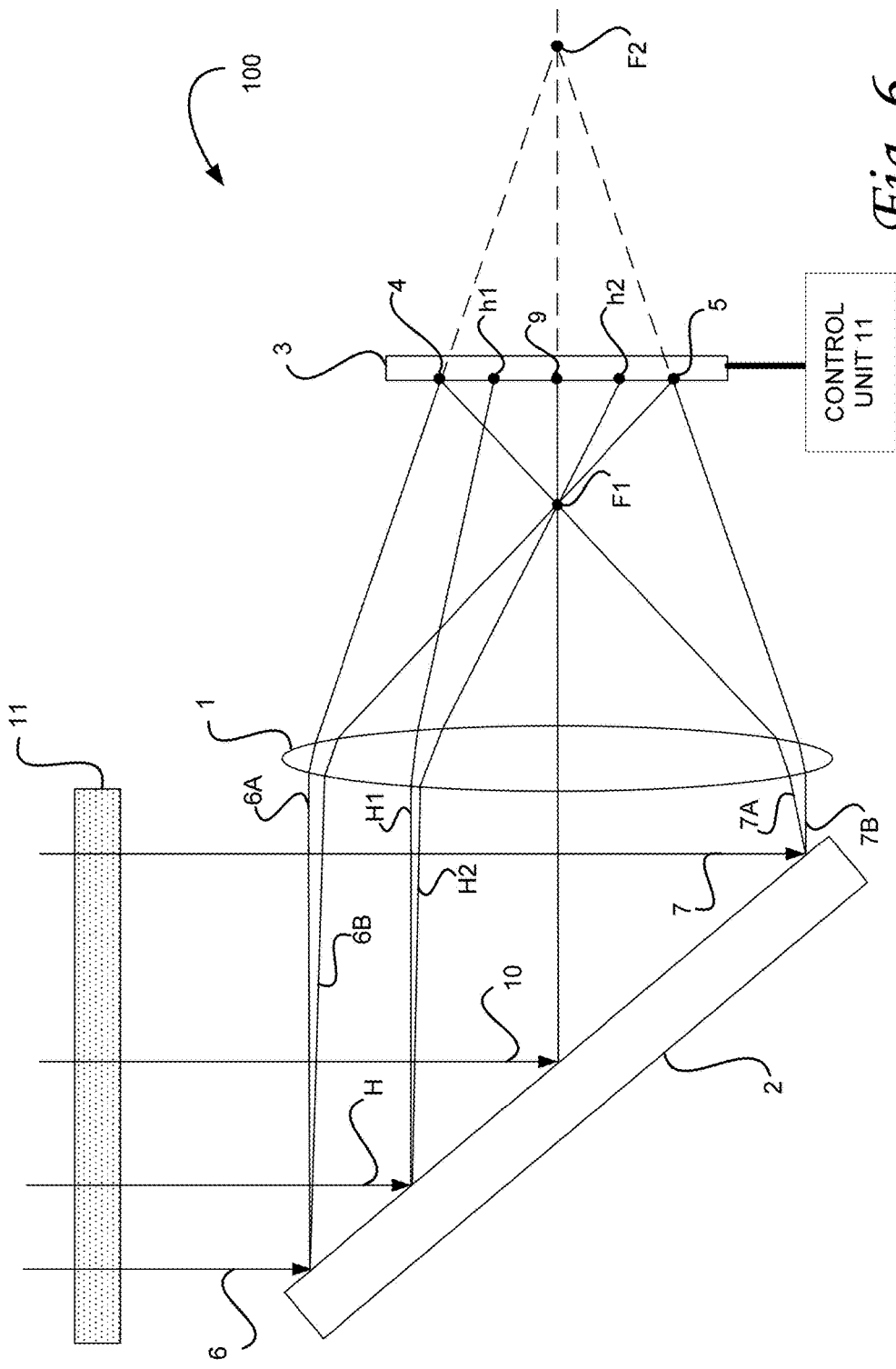
Figure 7:
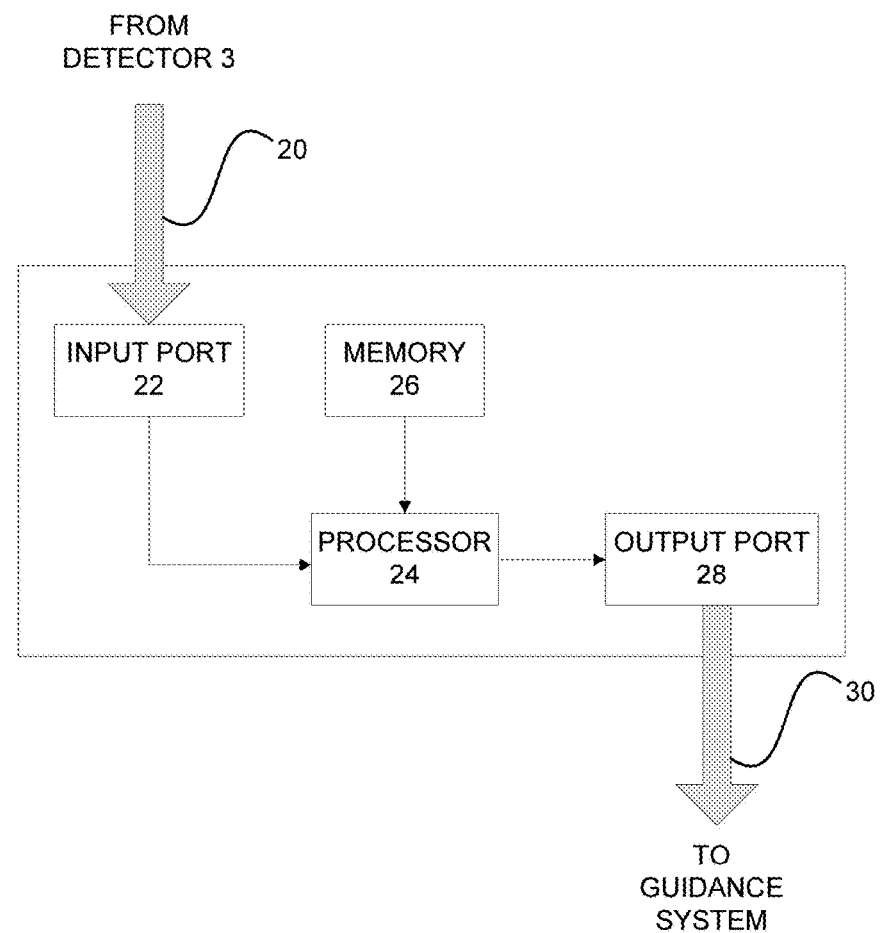
Figure 8:
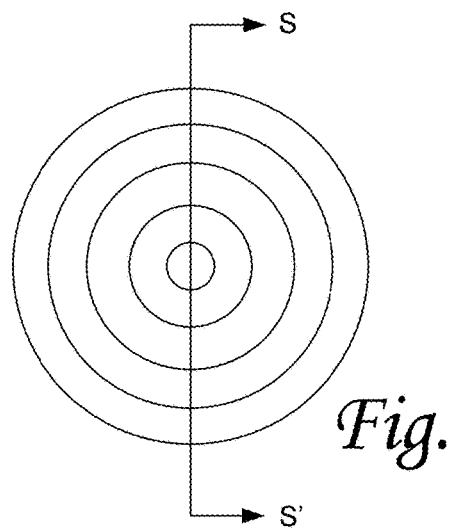
Figure 9:
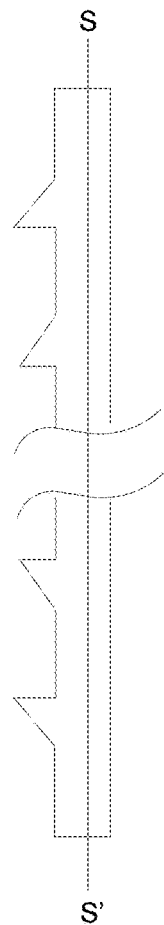
Figure 10:
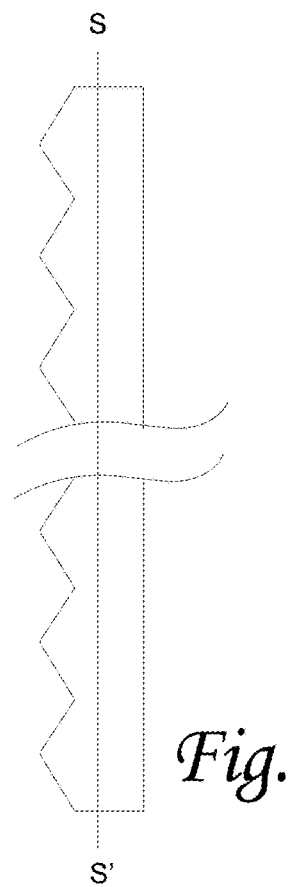

These and other features, aspects, and advantages of the present inventions will become better understood with regard to the following description, appended claims and drawings where:

FIG. 1 is a drawing that illustrates a mode of operation of LGWs, for guiding the LGWs to a target, as known in the art;

FIG. 2 is a schematic drawing illustrating a side cross section of a system of the present invention having a refractive bifocal element, in which the incoming light is parallel to the main optical axis;

FIG. 3 is s schematic drawing illustrating a frontal view of a detector of the system of FIG. 2, showing that the beam spot is in the null or center position;

FIG. 4 is a schematic drawing illustrating a side cross section of a system of the present invention having a refractive bifocal element, in which the incoming light is not parallel to the main optical axis;

FIG. 5 is a schematic drawing illustrating a frontal view of a detector of the system of FIG. 4, showing that the beam spot moves from the null or center position;

FIG. 6 is a schematic drawing illustrating a side cross section of a system of the present invention having a reflective bifocal element;

FIG. 7, which is a block diagram illustrating a control unit in communication with detector of the system of FIGS. 2-6, according to some embodiments of the present invention;

FIG. 8 is a schematic drawings illustrating a front view of the bifocal optical element having concentric circles, according to some embodiments of the present invention;

FIG. 9 is a schematic drawing illustrating a sawtooth Fresnel lens configuration of the bifocal optical element, modified by adding flat area between the lens segments, modified by adding flat area between the lens segments, according to some embodiments of the present invention; and FIG. 10 is a schematic drawing illustrating a sawtooth lens configuration of the bifocal optical element, in which each section with a positive slope is followed to a section with a negative slope, according to some embodiments of the present invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Referring now to FIG. 2-5. FIG. 2 is a schematic drawing illustrating a side cross section of a system 200 of the present invention having a refractive bifocal element 2, in which the incoming light is parallel to the main optical axis. FIG. 3 illustrates a frontal view of a detector of the system of FIG. 2, showing that the beam spot is in the null or center position. FIG. 4 is a schematic drawing illustrating a side cross section of a system of the present invention having a refractive bifocal element 2, in which the incoming light is not parallel to the main optical axis. FIG. 5 is a schematic drawing illustrating a frontal view of a detector of the system of FIG. 4, showing that the beam spot moves from the null or center position.

The system 200 is configured for being part of a LGW's seeker head, for receiving a laser beam bundle, and for enabling the determination of a centroid of the beam bundle. The position of the centroid of the bundle is indicative of a direction of a target with respect to the LGW's seeker head. Determination of the centroid, therefore enables a control unit to operate the LGW's control surfaces to guide the LGW to the target. The system 200 includes a main lens 1, a bifocal element 2, and a detector 3.

A bundle of laser beams reflected from a target is represented by the beams 6, 7, and 10. The beams 6 and 7 represent the border of the beam bundle, such that the intensity or amplitude of the laser light between the beams 6 and 7 is above a certain threshold and/or can be sensed by the detector 3. Outside the segment between the beams 6 and 7, the intensity or amplitude is below the threshold and/or cannot be sensed by the detector 3. It should be noted that FIGS. 2 and 4 illustrate a two-dimensional side cross-sectional view of the system 200. Thus the segment between the beams 6 and 7 represents a disk-like shape where the beams 6 and 7 are located at the circumference of the disk-like shape. The central beam 10 is the central beam of the beam bundle.

The beam bundle illuminates the bifocal element 2. The bifocal element 2 creates two sets of beams. Optionally, each set of beams has equal energy. There may be some losses depending on the lens design and coating. but the goal is to send equal energy to each focus. A first set is bordered by the beams 6B and 7A, while the second set is bordered by the beams 6A and 7B. In some embodiments of the present invention, the bifocal element 2 focuses the two beam sets to respective focal points F1 and F2 along the same axis. In another variant, the main lens 1 is required to focus the two beams to the focal points F1 and F2. In other words, the bifocal element 2 and the main lens 1 may be integrated as a single element or may be two discrete elements having focal axes. If the bifocal element 2 and the main lens 1 are two discrete elements, they are positioned with respect to each other such that their focal axes are parallel to each other and overlap.

The bifocal element 2 and main lens 1 may be located with each other in any order. In one variant, the bifocal element is upstream of the main lens with respect to the incoming beam bundle (i.e., the bifocal element main is illuminated by the incoming beam). In another variant, the bifocal element is downstream of the main lens with respect to the incoming beam bundle (i.e., the main lens main is illuminated by the incoming beam).

Optionally, the main lens 1 is replaced by one or more refractive elements (which may or may not be lenses) configured for focusing the beam bundle and/or the beam sets. In a variant, one or more of the refractive elements are located upstream of the bifocal element 2, while one or more of the refractive elements are located downstream of the bifocal element 2.

The detector 3 has a sensing surface perpendicular to the focal axis of the bifocal element 2, and is located between the focal points F1 and F2. Thus, the light impinging the detector 3 is unfocused. Placing the detector between the focal points causes the detector 3 to receive an upright image of the beam bundle and an inverted image of the beam bundle. It should be noted that the location of the detector is determined such that the radius of the spot created by the first unfocused set of beams (inverted image) is about equal to the radius of the spot created by the second unfocused set of beams (upright image). In this manner, the two spots (two images) overlap on the sensing surface, as shown in FIGS. 2 and 4. The spot diameter may be optimized by the system designer for a desired linear field of view.

The spot created by the two overlapping sets of beams on the detector's sensing surface is a disk-like spot having a circumference 8 and a centroid 9. The size of the spot is set by the distance between F1 and F2 in relation the average focal length of the optics.

A hotspot beam H is part of the incoming beam bundle. The amplitude (or intensity) of the hotspot beam H may differ sharply from the amplitudes or intensities of the surrounding beams. This may be caused by many agents, such as an imperfection on the lens or bifocal element, or dirt on the lens or bifocal element. The bifocal element 2 creates two beams H1 and H2 from the hotspot beam. The first beam H1 is part of the beam set enclosed by beams 6A and 7B. The second beam H2 is part of the beam set enclosed by the beams 6B and 7A. The beams H1 and H2, therefore encounter the sensing surface of the detector 3 at locations h1 and h2, respectively, within the circumference 8, as shown in FIGS. 2-5.

The detector's sensing surface is divided into four quadrants, as A, B, C, and D, as shown in FIGS. 3 and 5. Because h1 is part of the upright image and h2 is part of the inverted image projected on the detector's sensing surface, the locations h1 and h2 are symmetrical with respect the centroid 9.

The total intensity of the light received is measured at each quadrant. The location of the centroid on the detector's sensing surface may be described by an azimuth (projection of the centroid on the horizontal axis separating the upper quadrants A and B from the lower quadrants C and D) and an elevation (projection of the centroid on the vertical axis separating the left quadrants A and D from the right quadrants B and C).

The location of the centroid can be calculated by using the intensities $I_A$, $I_B$, $I_C$, $I_D$ at quadrants A, B, C, D, respectively. The azimuth and elevation coordinates for the centroid of the spot can be calculated as follows:

$$\text{Azimuth} = \{(I_A+I_D)-(I_B+I_C)\}/\{I_A+I_B+I_C+I_D\} \quad [\text{Eq. 1}]$$

$$\text{Elevation} = \{(I_A+I_B)-(I_C+I_D)\}/\{I_A+I_B+I_C+I_D\} \quad [\text{Eq. 2}]$$

Two cases may be found in the use of the system 200. In the first case, the LGW's seeker head points toward the target and the LGW travels toward the target. Thus, no adjustment is to be made. In this case, the angle of propagation of the beam bundle is parallel to the main optical axis of the system 200 (defined by the focal axis of the main lens and/or bifocal element), and the centroid of the spot is at the null point, i.e. at the meeting point of all four quadrants. The first case is illustrated by FIGS. 2 and 3.

In the second case, the LGW's seeker head does not point toward the target, and the LGW does not travel toward the target. Thus a correction in the path of the LGW is to be made. In this case, the angle of propagation of the beam bundle is not parallel to the main optical axis of the system 200, and the centroid is off the null point. The second case is illustrated by FIGS. 4 and 5.

Reference is now made to the first case as illustrated by FIGS. 2 and 3. In the embodiment in which the bifocal element 2 creates two beam sets having about equal energy, the effects at the locations h1 and h2 on the intensity at their respective quadrants are the same. It should be noted that locations h1 and h2 are located in respective quadrants that only meet at the centroid and are not separated by a segment. Thus, the effects at the locations h1 and h2 are cancelled by the operations of equations 1 and 2. In this manner, the calculation of the azimuth and elevation of the centroid are not affected by the hot spot.

Reference is now made to the second case as illustrated by FIGS. 3 and 4. When the target is at an angle to the main optical axis, the spot's centroid moves off null, and hot spot symmetry with respect to null progressively degrades. Thus, the operations of equations 1 and 2 effect a cancellation of the hot spot effects that is only partially effective. Rounded lens transition surfaces on the main lens 1 and/or on the bifocal element 2 provide a blurring effect. The blurring effect distributes any hotspots within the image. Thus, the blurring effect enhances cancellation of hot spot when the centroid is off-axis or near quadrant boundaries.

In some embodiments of the present invention, the system 200 includes a diffuser 11. The diffuser 11 enhances the defocusing of the two beam sets, and therefore increases the cancellation of the hot spot effects when the centroid of the spot on the detector's sensing surface moves away from null. The diffuser may be located in any location, so as to interact with the incoming beam bundle or with the two beam sets before the beam sets reach the detector's sensing surface.

The illustrative single point example described above may be repeated for a multitude of hot spots, so that at null the energy centroid 9 of the incident beam pattern on the detector is independent of the variation of energy from the target across the faceplate of the main lens 1.

The detector 3 may be any known kind of detector. Non-limiting examples of detector types that can be used in the system 200 include avalanche photo diodes (APD) or PIN detectors. These detectors may be made from In Ga As or Si materials depending on the wavelength of the incoming laser beam bundle.

It should be noted that in the non-limiting examples of FIGS. 2-5, the sensing surface of the detector 3 is shown to be divided into four equal portions. Such feature is not a necessity. In fact, the sensing surface can be divided into any even number of portions greater than or equal to four. The portions of the detector's sensing surface are set in pairs opposite to each other with respect to the center of the sensing surface, such that the portions of any pair are symmetrical to each other with respect to the center of the sensing surface. In this manner, the effects of a hot spot (points h1 and h2) are located on portions that are symmetrical to each other with respect to the center of the sensing surfaces. Because the effects of the hot spot are also are symmetrical to each other with respect to the center of the sensing surfaces, it is easy to cancel or diminish the hot spot effects in the calculation of the azimuth and elevation of the centroid. Optionally, the portions are equal to each other.

Reference is now made to FIG. 6, which is a schematic drawing illustrating a system 200 of the present invention, in which the bifocal element 2 is reflective.

In the example of FIG. 6, the beam bundle impinges the bifocal element 2, and is reflected there from toward the main lens 1 in the form of the sets of beams. The main lens 1 refracts the two beam sets as described before. The orientation of system 200 of the example of FIG. 6 within the LGW depends on the angle reflective surface of the bifocal element 2 and the optical axis of the main lens 1 and on the distance between the bifocal element 2 and the main lens 1.

The detector 3 has a sensing surface perpendicular to the focal axis of the main lens 1, and is located between the focal points F1 and F2. Thus, the light impinging the detector 3 is unfocused. Placing the detector between the focal points causes the detector 3 to receive an upright image of the beam bundle and an inverted image of the beam bundle. It should be noted that the location of the detector is determined such that the radius of the spot created by the first unfocused set of beams (inverted image) is about equal to the radius of the spot created by the second unfocused set of beams (upright image). In this manner, the two spots (two images) overlap on the sensing surface, as shown in FIG. 6.

It should be noted that the order of the optical elements (bifocal element, main lens, and diffuse, if present) may be changed, as mentioned above.

Reference is now made to FIG. 7, which is a block diagram illustrating a control unit 11 in communication with detector of the system 200, according to some embodiments of the present invention.

The system 200 is associated with a control unit 11, which may or may not be part of the system. The control unit 11 includes an input port 22, a processor 24, non-volatile memory 26, and an output port 28. As seen in FIGS. 2-5, the control system 11 is in communication with the detector and is configured to receive from the detector first data 20 indicative of intensity measurements from each quadrant.

The input port 22 is configured for receiving the first data 20, and transmitting the first data 20 to the processor 24. The processor 24 is configured for processing the first data 20 according to instructions stored in the non0volatile memory 26, to determine the location of the spot's centroid.

The location of the centroid may be determined according to equations 1 and 2, above. It should be noted, however, that further processing may be used in order to accurately determine the position of the centroid. Due to a circular image being projected onto a quadrant detector, the light intensity for each detector segment is only symmetrical when the image is perfectly on axis ($I_A=I_B=I_C=I_D$). As the image moves across the face of the detector, the angular error is a monotonic but non-linear function of the position of the centroid, as can be seen by the following equation:

$$E_x = \frac{2}{\pi}\left(\frac{x}{r}\sqrt{1-\left(\frac{x}{r}\right)^2} + \arcsin\frac{x}{r}\right)$$

where $E_x$ is the angular error (i.e. the divergence between the calculated coordinate of the centroid along an axis x and the actual centroid's coordinate along the axis x), r is the diameter of the circular image on the detector, and x is the centroid position on the detector relative to the axis (azimuth or elevation).

Therefore, the azimuth and elevations calculated via equations 1 and 2 require correction. The correction may be effected via one or more algorithms or via predetermined lookup tables stored in the non-volatile memory 26 that convert raw azimuth and elevation data into angular positions relative to center.

The processor is further configured for generating a control signal 30 based on the location of the centroid and/or the angular positions relative to center. The control signal is transmitted by the output port 28 received by an appropriate guidance system in the LGW, which operates the LGW's control surfaces and/or propulsion system in accordance to the control signal in order to adjust the LGW's course and cause the LGW to hit the target.

Reference is now made to FIGS. 8-10, which are schematic drawings illustrating some examples of the refractive bifocal optical element 2 of FIGS. 2-5, according to some embodiments of the present invention.

The bifocal optical element 2 may comprise a refractive element (for example, a lens) where approximately 50% of the energy is diffracted to the shorter focus F1 and the other 50% is diffracted to the longer focus F2. There may be at least two ways to achieve this bifocal effect. Multiple lenses may be molded within the entry aperture to create aperture segmentation, or the wave front may be split with a diffractive surface. The multiple lens solution results in lower losses due to geometric considerations and easier coating application. Smaller lenses have better aperture energy smoothing, but a higher MTF (Modulation Transfer Function). The diffraction surface has the advantage that all areas of the lens surface contribute to each focus, leading to less aperture dependence. The diffraction element may be a separate plate 2 or incorporated into the main focusing lens 1, for example by a suitably shaped mold.

An example of a bifocal optical element 2 is shown in FIGS. 8-10. FIG. 8 shows a front view of the bifocal optical element 2 having concentric circles, as used in a typical Fresnel-based lens. In this implementation, the concentric circles approach is used, but 50% of the area is of a different focal length from the other 50%. An example of a side view of the section S-S' of FIG. 8 is shown in FIG. 9. The concentric circles of FIG. 8 may be created by using a sawtooth Fresnel lens configuration modified by adding flat area between the lens segments. In this configuration 50% of the input beam is focused and 50% is left unaffected, thus creating a distributed bifocal lens.

Another example of a geometry of the bifocal optical element 2 is shown in FIG. 10. The lateral cross-section section of the bifocal optical element 2 in this examples has a sawtooth configuration creating the bifocal effect. In FIG. 10 at least some portions having negative slopes is sided by two respective portions having a positive slope. Optionally, the absolute values of the positive and negative slopes are equal.

The lack of a sharp step (which is present in the Fresnel lens FIG. 9) may reduce the losses that may be cause by unwanted interaction of the incoming beam with the step geometry. The dual slope geometry of FIG. 10 halves the dispersion needed as the beam is steered both in a positive and negative direction from the normal. A very sharp peak and valley of the bifocal lens may be difficult to manufacture. Therefore, the transitions between the positive slopes and the negative slopes may be rounded. The rounding of the transitions creates a soft focus.

Although the structure of the bifocal optical element 2 is primarily a lens, controlled transitions between the slopes may create a diffuser effect within the same structure and at no extra cost. This soft focus aids in increasing the intensity homogeneity at the spot impinging the detector spot. The bifocal optical element 2 may be placed in front of the main lens 1 in the collimated beam from the target, and may have the advantage that different spot sizes on the detector can be achieved by only changing the plate.

The bifocal optical element 2 may be integrated into either or both surfaces of the main lens 1, and in high volume production this element may be molded. The optical losses due to the interaction of light with a plurality of interfaces may be reduced in this case.

Regarding the main lens 1, any type of lens or combination of different lenses may be used. Non-limiting examples of lens types that may be used as part of the main lens 1 a simple plano-convex lens, aspheric lens or a more complex lens combination such as a doublet.

While the invention(s) has/have been described with respect to a limited number of embodiments, these should not be construed as limitations on the scope of the invention (s), but rather as examples of some of the embodiments. Those skilled in the art may envision other possible variations, modifications, and implementations that are also within the scope of the invention(s), and claims, based on the disclosure(s) set forth herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of locating at least one object being illuminated by a laser designator, the method comprising:
   (i) providing a tracker having a detector in a field of view, the detector having a sensing surface divided into an even number of portions, the even number being at least four, such that all portions meet at a middle point of the sensing surface, the detector being configured for measuring an intensity of impinging light at each portion;
   (ii) receiving a beam of laser light scattered by the at least one object being illuminated by the laser designator;
   (iii) causing the received laser light to impinge the detector's sensing surface, such that an upright image and an inverted image of the scattered laser light beam are projected on the detector, the upright image and the inverted image having substantially equal sizes and substantially equal energies;
   (iv) measuring intensities of portions of the upright image and of the inverted image impinging each portion of the detector;
   (v) processing the measured intensities to find a centroid of the projected laser light, the centroid of the projected laser light being indicative of a location of the object with respect to the tracker.

2. The method of claim 1, wherein step (iii) comprises:
   creating two secondary beams of substantially equal energies from the received beam;
   focusing the two secondary beams to respective focal points along a single axis, such that the sensing surface of the detector is located between the focal points, at a location in which the secondary beams have equal cross-sectional length.

3. The method of claim 2, wherein creating two secondary beams comprises providing a bifocal optical element in an optical path of the received beam.

4. The method of claim 3, wherein the bifocal element is refractive or reflective.

5. The method of claim 3, wherein focusing the two secondary beams comprises providing a refractive unit in an optical path of the received beam or in respective optical paths of the two secondary beams.

6. The method of claim 5, wherein the refractive unit is integrated with the bifocal optical element or is separate from the bifocal optical element.

7. The method of claim 3, wherein:
   the bifocal optical element sports concentric circular surfaces;
   circumferences of the circular surfaces are centered around an optical axis of the bifocal optical element;
   each circular surface has a respective slope which is at a non-zero angle with the optical axis of the bifocal optical element;
   the concentric circular surfaces have respective slopes chosen from two predetermined slopes;
   in at least one portion of the bifocal optical element, each circular surface having a first of the two predetermined slopes is adjacent to a subsequent circular surface having a second of the two predetermined slopes;
   substantially half of the incident beam interacts with the circular surfaces having the first slope, and substantially half of the incident beam interacts with the circular surfaces having the second slope.

8. The method of claim 7, wherein the first slope is perpendicular to the optical axis of the bifocal optical element.

9. The method of claim 7, wherein the first and second slopes have a similar absolute value and opposite sign.

10. The method of claim 7, wherein transition zones between circular surface of different slopes are rounded.

11. The method of claim 7, wherein the bifocal optical element is impressed on at least one surface of a focusing lens.

12. The method of claim 3, wherein:
   the bifocal optical element sports concentric circular surfaces;
   circumferences of the circular surfaces are centered around an optical axis of the bifocal optical element;
   each circular surface has a respective slope which is at a non-zero angle with the optical axis of the bifocal optical element;
   the concentric circular surfaces have respective slopes, such that the bifocal optical element has two foci.

13. The method of claim 3, wherein the bifocal optical element comprises a Fresnel lens, having a 50% diffraction section and a 50% pass through section.

14. The method of claim 1, wherein the portions of the detector's sensing surface are set in pairs opposite to each other with respect to the center of the sensing surface, such that the portions of any pair are symmetrical to each other with respect to the center of the sensing surface.

15. The method of claim 14, wherein an angle between a first line separating a portion from a preceding portion and a second line separating the portion from a subsequent portion is equal for all portions.

16. The method of claim 1, wherein the detector sensing surface is divided into four equal portions.

17. The method of claim 16, wherein processing the measured intensities comprises calculating an azimuth and an elevation of the centroid via formulas:

Azimuth=$\{(I_A+I_D)-(I_B+I_C)\}/\{I_A+I_B+I_C+I_D\}$; and

Elevation=$\{(I_A+I_B)-(I_C+I_D)\}/\{I_A+I_B+I_C+I_D\}$;

wherein $I_A$, $I_B$, $I_C$, $I_D$ are intensities measured at quadrants A, B, C, D, the quadrant A being a top left quadrant, the quadrant B being a top right quadrant, the quadrant C being a bottom right quadrant, and the quadrant D being a bottom left quadrant.

18. The method of claim 17, wherein processing the measured intensities comprises the correcting the calculated azimuth and elevation when the centroid is removed from the center of the detector's sensing surface.

* * * * *